US011685083B2

(12) United States Patent
Persaud et al.

(10) Patent No.: US 11,685,083 B2
(45) Date of Patent: Jun. 27, 2023

(54) FLEXIBLE POLYMER-BASED MATERIAL FOR HOT ISOSTATIC PRESSING OR WARM ISOSTATIC PRESSING MOLDS

(71) Applicants: Rejendra Persaud, Westerville, OH (US); Salvatore Moricca, Woonona (AU)

(72) Inventors: Rejendra Persaud, Westerville, OH (US); Salvatore Moricca, Woonona (AU)

(73) Assignee: AMERICAN ISOSTATIC PRESSES, INC., Columbus, OH (US)

( * ) Notice: Subject to any disclaimer, the term of this patent is extended or adjusted under 35 U.S.C. 154(b) by 0 days.

(21) Appl. No.: 16/867,055

(22) Filed: May 5, 2020

(65) Prior Publication Data
US 2020/0376723 A1 Dec. 3, 2020

Related U.S. Application Data

(62) Division of application No. 14/972,858, filed on Dec. 17, 2015, now Pat. No. 10,647,033.

(60) Provisional application No. 62/093,033, filed on Dec. 17, 2014.

(51) Int. Cl.
| | | |
|---|---|---|
| B29C 43/10 | (2006.01) | |
| B32B 15/20 | (2006.01) | |
| B32B 27/34 | (2006.01) | |
| B32B 7/12 | (2006.01) | |
| B32B 27/32 | (2006.01) | |
| B32B 7/00 | (2019.01) | |
| B32B 15/08 | (2006.01) | |
| B32B 27/06 | (2006.01) | |
| B29C 43/36 | (2006.01) | |
| B22F 3/12 | (2006.01) | |
| B32B 15/00 | (2006.01) | |
| B32B 27/00 | (2006.01) | |
| B22F 3/15 | (2006.01) | |
| B32B 15/04 | (2006.01) | |
| B32B 27/36 | (2006.01) | |
| B29K 67/00 | (2006.01) | |
| B29K 77/00 | (2006.01) | |
| B29K 305/02 | (2006.01) | |
| B29K 305/10 | (2006.01) | |
| B29L 9/00 | (2006.01) | |
| B29C 43/32 | (2006.01) | |

(52) U.S. Cl.
CPC ............ *B29C 43/10* (2013.01); *B22F 3/1241* (2013.01); *B22F 3/15* (2013.01); *B29C 43/3642* (2013.01); *B32B 7/00* (2013.01); *B32B 7/12* (2013.01); *B32B 15/00* (2013.01); *B32B 15/04* (2013.01); *B32B 15/08* (2013.01); *B32B 15/20* (2013.01); *B32B 27/00* (2013.01); *B32B 27/06* (2013.01); *B32B 27/32* (2013.01); *B32B 27/322* (2013.01); *B32B 27/34* (2013.01); *B32B 27/36* (2013.01); *B29C 2043/3222* (2013.01); *B29C 2043/3647* (2013.01); *B29K 2023/04* (2013.01); *B29K 2067/003* (2013.01); *B29K 2077/00* (2013.01); *B29K 2305/02* (2013.01); *B29K 2305/10* (2013.01); *B29L 2009/003* (2013.01); *B32B 2307/00* (2013.01); *B32B 2307/546* (2013.01); *B32B 2307/7242* (2013.01); *B32B 2307/7244* (2013.01); *B32B 2307/732* (2013.01); *B32B 2439/00* (2013.01); *B32B 2439/06* (2013.01); *B32B 2439/46* (2013.01)

(58) Field of Classification Search
CPC ....... B32B 15/00; B32B 15/04; B32B 27/322; B32B 27/34; B32B 15/08; B32B 7/00; B32B 27/00; B32B 7/12; B32B 7/02; B32B 15/20; B32B 27/32; B32B 27/36; B32B 27/06; B32B 2307/7244; B32B 2307/732; B32B 2307/00; B32B 2307/7242; B32B 2439/00; B32B 2439/06; B32B 2307/546; B32B 2439/46; B29C 43/3642; B29C 43/10; B29C 2043/3222; B29C 2043/3647; B22F 3/15; B22F 3/1241; B29L 2009/003; B29K 2077/00; B29K 2023/04; B29K 2067/003; B29K 2305/02

See application file for complete search history.

(56) References Cited

U.S. PATENT DOCUMENTS

| | | | |
|---|---|---|---|
| 6,543,208 B1 * | 4/2003 | Kobayashi ............. | B32B 27/08 53/452 |
| 2012/0060704 A1 * | 3/2012 | Wilkinson ............ | B30B 11/001 100/35 |
| 2012/0100033 A1 * | 4/2012 | Voice .................... | B22F 3/1216 419/49 |
| 2014/0083890 A1 * | 3/2014 | Ishizaki ................ | B32B 27/308 206/438 |

* cited by examiner

Primary Examiner — Monica A Huson
(74) Attorney, Agent, or Firm — Finnegan, Henderson, Farabow, Garrett & Dunner, LLP

(57) ABSTRACT

There is disclosed a sealable, flexible membrane for encapsulating a part to be isostatically pressed at an elevated temperature. The membrane includes at least one first layer of polymeric film having a melting point above the elevated temperature, and at least one second layer disposed on the first layer. The second layer comprising a metal. In one embodiment, the metal comes into contact with the part to be isostatically pressed. The membrane, which typically has a thickness ranging from 10 to about 500 μm, and is impermeable to the flow of liquids and gases when sealed, can be used to warm press parts up to about 350° C. and pressures ranging from 5,000 psi to 100.000 psi. Methods to isostatically press parts using this sealable, flexible membrane are also disclosed. Bags made from the sealable, flexible membrane that are used in isostatic presses are also disclosed.

18 Claims, No Drawings

FLEXIBLE POLYMER-BASED MATERIAL FOR HOT ISOSTATIC PRESSING OR WARM ISOSTATIC PRESSING MOLDS

CROSS-REFERENCE TO RELATED PATENT APPLICATIONS

This application is a Divisional Application of U.S. patent application Ser. No. 14/972,858, which claims the benefit of U.S. Provisional Application No. 62/093,033, filed Dec. 17, 2014, both of which are incorporated herein by reference in their entireties.

The present disclosure generally relates to a polymer based membranes used to encapsulate parts prior to being isostatically pressed, typically at elevated temperatures. Methods of isostatically pressing parts at elevated temperatures by encapsulating them is the disclosed polymer-based membrane are also disclosed.

Isostatic pressing is a powder processing technique that uses fluid or gas pressure in order to compact a part. In this process, metal or ceramic powders are typically placed in a flexible container that serves as the mold for the pressed part. The flexible mold, which is commonly polyurethane, can be removed and refilled after each pressure cycle (called wet bag) or can be an integral and permanent part of the pressing vessel (called dry bag). The wet bag process is typically used for larger, more complicated parts, whereas the dry bag method is typically used for compaction of simpler and smaller parts. This manufacturing process consists of two main categories, cold isostatic pressing and hot isostatic pressing.

Cold isostatic pressing, (CIP), is performed at room temperature and uses a mold made from an elastomer material such as urethane, rubber, or polyvinyl chloride. One disadvantage to this manufacturing process is the inability to achieve 100% density, and a low geometric accuracy because of the flexible mold.

Hot isostatic pressing, (HIP), is performed at an elevated temperature, usually >75% of the melting point of the material to be processed, and thus causes an elimination of practically all porosity, producing a pressed product that is essentially 100% dense. In addition to the elimination of porosity, this powder process provides nearly complete bonding throughout the structure of the material. The mold material in hot isostatic pressing must be one that maintains its integrity throughout the operation, such as sheet metal, glass or ceramic. Unlike CIP, molds used in HIP processes are not flexible at low temperatures but become "plastic" or deformable at higher temperatures.

Warm isostatic pressing, (WIP), is a process that falls between CIP and HIP conditions. It is performed at a temperature ranging from above room temperature to less than about 500° C., such as less than about 300° C. Warm isostatic pressing achieves some benefits of both cold isostatic pressing and hot isostatic pressing. In particular, warm isostatic pressing allows the use of a flexible mold, but the elevated temperatures associated with this process cause the resulting product to exhibit higher density than a CIP process. However, at temperatures associated with WIP, most metal cans used as molds in HIP processes retain a majority of their strength and thus resist the pressure being transmitted. Therefore, rather than deforming uniformly, these cans will buckle and deform unevenly destroying or distorting the component that is being fabricated.

In addition, rubber molds used for CIPing degrade at temperatures associated with WIPing. These rubber molds are also costly, and have a limited life. Furthermore, these rubber molds by virtue of the way they are sealed for CIPing do not seal against the high pressure gas, and are permeable to the pressurizing gases. Additionally, rubber molds tend to be relatively thick (such as >5 mm thick) and have an elastic hysteresis on decompression. This delay in recovering the original shape can actually cause damage for thin or fragile parts. Thus, rubber molds used in CIP processes are impractical to use in combination: at the higher temperatures used in WIPing and use of gas pressure as a medium.

There remains a need for a mold material that can withstand the elevated temperatures of warm isostatic pressing, while not suffering from the previously noted deficiencies of current molds used in HIP and CIP processes.

There is disclosed a sealable membrane for encapsulating a part to be isostatically pressed at an elevated temperature, which is above room temperature, the membrane comprising: at least one first layer of polymeric film having a melting point above said elevated temperature: at least one second layer disposed on said first layer, the second layer comprising a metal interface that comes into contact with the part to be isostatically pressed. The membrane described herein has a thickness ranging from 10 to about 500 µm, and is impermeable to the flow of liquids and gases when sealed.

There is also disclosed a method of isostatically pressing a part at elevated temperature, the method comprising: placing the part in a sealable membrane comprising: at least one first layer of polymeric film having a melting point above the elevated temperature; at least one second layer disposed on the first layer, the second layer comprising a metal that comes into contact with the part to be isostatically pressed, wherein the membrane has a thickness ranging from 10 to about 500 µm, sealing the membrane to form a hermetically sealed first bag that is impermeable to the flow of liquids and gases; introducing the hermetically sealed first bag into an isostatic press; and applying pressure to the hermetically sealed first bag at a temperature of up to 350° C. via a pressurizing gas.

There is further disclosed a bag for encapsulating a part to be isostatically pressed at an elevated temperature, which is above room temperature, the bag comprising: at least one first layer of polymeric film having a melting point above the elevated temperature: at least one second layer disposed on the first layer, the second layer comprising a metal that comes into contact with the part to be isostatically pressed, wherein the bag comprises at least one sealable, open end for receiving the part to be pressed, wherein the at least one sealable, open end forms a hermetic seal that is impermeable to the flow of liquids and gases when sealed.

The present disclosure describes polymer-based membranes, such as a bag or pouch for encapsulating a part that is to be isostatically pressed at an elevated temperature, such as hot or warm isostatic pressing.

In some aspects, a sealable membrane for encapsulating a part to be isostatically pressed at an elevated temperature, which is above room temperature, comprises at least one first layer of polymeric film having a melting point above the elevated temperature, and at least one second layer disposed on the first layer, the second layer comprising a metal that comes into contact with the part to be isostatically pressed.

The disclosed membrane may have a thickness ranging from 10 to about 500 µm, such as from 25 to 400 µm, from 50 to 300 µm, and from 100 to 200 µm. The combination of material and thickness leads to a finished bag or pouch that can be hermetically sealed, and that is impermeable to the flow of liquids and gases. In one embodiment, the disclosed membrane has no elastic hysteresis on decompression.

The polymer-based membrane includes any known polymer resin that can withstand a temperature or up to 350° C., such as a temperature ranging from 30° C. to 350° C., or from 100° C. to 350° C., without thermal degradation.

Non-limiting examples of such a polymer resin include polyethylene, polypropylene, such as oriented polypropylene, polyester, polyethylene terephthalate (PET), such as biaxially-oriented PET, polyamide, or combinations thereof.

In one embodiment the polyethylene described herein may include ultrahigh molecular weight polyethylene.

In one embodiment, the polyamide may include copolyamides 6/12, copolyamides of polyamide 6 and a partially aromatic polyamide and ternary copolyamides based on polyamide 6, polyamide 11, and polyamide 66, or combinations thereof.

The second layer may comprise a metal that may be deposited using a physical vapor deposition process thickness ranging from 0.1 to 2.0 μm using. Examples of metals that can be used in the second layer include aluminum, copper and nickel.

In one embodiment, the second layer may comprise a metallized polymer film, such as metallized polyester films having a low coefficient of friction, such as one below 0.6 μs, below 0.4 μs, below 0.3 μs, such as a coefficient of friction ranging from 0.3 μs to 0.5 μs, (as measured by ASTM 1894). No-limiting examples of such materials are those sold by Toray™, under the tradename LumLife MS26 Lumirror® Polyester Films. In one embodiment, the second layer comprising the metal or metallized polymer film comes into contact with the part to be isostatically pressed.

The membrane described herein may comprise a laminate of two or more layers, such as a laminate of multilayer thermoplastic films, or additional layers of thermoplastic films. Non-limiting examples of the additional layers of thermoplastic films that might be part of the membrane include comprise one or more layers chosen from a heat-sealable layer, a gas barrier layer, an anti-sticking layer, or a strengthening layer.

In one embodiment, the anti-sticking layer composes a polytetrafluoroethylene containing interlayer, such as DuPont's Teflon® brand.

In one embodiment, the disclosed membrane may further include a thermoplastic polymeric adhesive in between the at least one first layer and at least one second layer, such as a layer located between a laminate of two or more layers.

In one embodiment, the disclosed membrane comprises a multilayer structure of at least four layers comprising repeating layers of polymer film and metal or metallized film, wherein the resulting multilayer. The resulting membrane may be impervious to aqueous solutions, both acidic and basic in chemical composition.

The present disclosure also describes methods of hot or warm isostatic pressing that includes encapsulating a part that is to be isostatically pressed in the polymer-based membrane described herein.

In some aspects, the method of isostatically pressing a part at elevated temperature comprises: placing the part in at least one sealable membrane comprising: at least one first layer of polymeric film having a melting point above the elevated temperature; at least one second layer disposed on the first layer, the second layer comprising a metal that comes into contact with the part to be isostatically pressed.

The method next comprises sealing the membrane, which may have a thickness ranging from 10 to about 500 μm, such as from 25 to 400 μm, from 50 to 300 μm, and from 100 to 200 μm, to form a hermetic seal that is impermeable to the flow of liquids and gases.

After sealing the membrane, the hermetically sealed membrane is then introduced into the isostatic press, and pressure, which may range from 5,000 psi to 100,000 psi, such as from 10,000 psi to 20,000 psi, is applied to the part at a temperature of up to 350° C., such as a temperature ranging from 30° C. to 350° C., or from 100° C. to 350° C., via a pressurizing gas, such as a argon or another inert gas.

The at least one first layer of polymeric film that can be used in the disclosed methods include polyethylene, polypropylene, such as oriented polypropylene, polyester, polyethylene terephthalate (PET), such as biaxially-oriented PET, polyamide, or combinations thereof.

In one embodiment, the polyethylene described herein may include ultrahigh molecular weight polyethylene.

In one embodiment, the polyamide may include copolyamides 6/12, copolyamides of polyamide 6 and a partially aromatic polyamide and ternary copolyamides based on polyamide 6, polyamide 11, and polyamide 66, or combinations thereof.

The second layer used in the described method comprises a metal that may be deposited using a physical vapor deposition process thickness ranging from 0.1 to 2.0 μm using. Non-limiting examples of such metals include aluminum, copper and nickel.

The method may also include depositing a layer of thermoplastic polymeric adhesive in between the at least one first layer and at least one second layer.

In one embodiment, the method includes evacuated the membrane via at least one port prior to applying said pressure. The membrane may be in the form of a bag or a pouch that has one opening, or port that allows it to be evacuated.

Multiple membranes may be used one ever the other to provide a redundancy in the event the primary bag falls. For example, two, three or even four bags may be used to insure desired sealing, and reduce issues associated with the permeability of gas through the bag.

Exemplary objects and advantages will be set forth in part in the description which follows, or may be learned by practice of the exemplary embodiments it is to be understood that both the foregoing general description and the following detailed description are exemplary and explanatory only and are not restrictive of the invention, as claimed.

The features and advantages of the present invention maybe more fully shown by the following examples, which are provided for purposes of illustration, and are not to be construed as limiting the invention in any way.

The part to be HIPed or WIPed is sized, and two sheets of the disclosed polymer film are cut to be larger than the component. One layer is placed on top of the other, which is followed by a heat sealing step of three (3) sides of the stacked film to create a pocket or envelope that will allow the part to easily slide into it. Alternatively a pre-made bag or tube of lay-flat tube can be used to create bag.

The part can then be inspected to determine if there are any sharp edges that may puncture the bag during processing. If there are sharp edges, they are preferentially rounded off or alternatively covered with a soft tape or rubber over the edges to prevent bag damage.

In an embodiment fixtures or pads can be custom made to prevent puncturing of the polymer film.

Bag sealer temperature and time are then set to ensure the film is sealed and the layers of polymer fuse together creating a good seal. This is typically predetermined depending bag material and thickness.

Additionally, aluminum foil can be used to prevent sticking of the part to the film and will also provide some barrier to sharp edges of the component. This aluminum foil, which can be used as an interlayer between the part that is being pressed and the heat sealable polymer film; is meant to eliminate or mitigate sticking of the part/powder to the polyester film, such as DuPont's Mylar™ film. However, low tear strength or ductility associated with some Al foils may require the use of a multiple-layer metalized film.

In one embodiment, the metallized material may comprise metallized polyester films, such as the metallized films sold by Toray, including LumLife MS26 Lumirror® Polyester Films. These films have a mirror surface finish with a very low coefficient of friction, such as one below 0.5 $\mu_s$, below 0.4 $\mu_s$, below 0.3 $\mu_s$, such as a coefficient of friction ranging from 0.3 $\mu_s$ to 0.5 $\mu_s$, (as measured by ASTM 1894). In one embodiment, the metallized material comes into contact with said part to be isostatically pressed. As a result, this layer should not stick to the pressed part. In one embodiment the metallized materials are multilayer structures, such as one comprising a layer of metal, such as Al, Cu or Ni, that is deposited, such as vacuum deposited, on a PET layer, with one or more optional layers there-between. For example, these optional layers may comprise an adhesion assistant layer or an adhesion primer layer.

In one embodiment, a vacuum bag sealer is used to evacuate the bag according to desired conditions. For example, larger components will need more time or in humid conditions more time is needed to degas the space in the bag. Vacuum bag sealers can be used that ensure the latter is capable of effective sealing of higher temperature film, such as Mylar™.

After sealing, the bag is again inspected to ensure it can hold a vacuum, as evident by the bag remaining tightly contoured to the part rather than in a relax condition. The later suggest that a bag has leaked or failed to seal properly.

Once satisfied that the bag is hermetically sealed, an oversized bag is made in which the first hermetically sealed bag can be inserted. Again the oversized second bag is vacuumed seal over the first bag. This is a recommended redundancy in the event the primary bag fails. This step can be repeated 2, 3, 4 or more times if further insurance of sealing is required to insure a proper seal, and reduce permeability of gas during processing. The sealed part or component can be then processed in the HIP or WIP system as described herein.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present disclosure.

Other embodiments of the invention will be apparent to those skilled in the art from consideration of the specification and practice of the embodiments disclosed herein. It is intended that the specification and examples be considered as exemplary only, with the true scope of the invention being indicated by the following claims.

What is claimed is:

1. A method of isostatically pressing a part at elevated temperature, said method comprising:
   placing said part in a sealable membrane having a melting point above 350° C. comprising:
   at least one first layer of polymeric film having a melting point above 350° C.;
   at least one second layer disposed on said first layer, said second layer comprising a metal, wherein said membrane has a thickness ranging from 10 to about 500 µm, sealing said membrane to form a hermetically sealed first bag that is impermeable to the flow of liquids and gases;
   introducing the hermetically sealed first bag into an isostatic press; and
   applying pressure to said hermetically sealed first bag at a temperature ranging from 30° C. to 350° C. via a pressurizing gas.

2. The method of claim 1, further comprising evacuating said membrane via at least one port prior to applying said pressure.

3. The method of claim 1, wherein said pressurizing gas comprises argon.

4. The method of claim 1, wherein said pressure ranges from 5,000 psi and 100,000 psi.

5. The method of claim 1, further comprising placing said hermetically sealed first bag into a second sealable membrane, and hermetically sealing said second bag.

6. The method of claim 5, further comprising placing said hermetically sealed second bag into a third sealable membrane, and hermetically sealing said third bag.

7. The method of claim 6, wherein at least one of said second bag or said third bag are additionally evacuated.

8. The method of claim 1, wherein said at least one first layer of polymeric film comprises one or more of the following:
   polyethylene comprising ultrahigh molecular weight polyethylene;
   polyamide chosen from copolyamides 6/12, copolyamides of polyamide 6 and a partially aromatic polyamide and ternary copolyamides based on polyamide 6, polyamide 11, and polyamide 66, or combinations thereof; and
   PET that is biaxially oriented.

9. The method of claim 1, wherein said metal comprises aluminum, copper, or nickel.

10. The method of claim 1, wherein the second layer comes into contact with said part to be isostatically pressed, and comprises a multilayer, metallized material.

11. The method of claim 10, wherein the multilayer, metallized material comprises a polyester film layer coated with an aluminum layer.

12. The method of claim 10, wherein the multilayer, metallized material has a coefficient of friction below 0.5 µs.

13. The method of claim 1, further comprising a layer of thermoplastic polymeric adhesive in between the at least one first layer and at least one second layer.

14. The method of claim 1, wherein said membrane comprises a multilayer structure of at least four layers, wherein said four layers are made of polymer film and metal or metallized film.

15. The method of claim 14, wherein the multilayer structure is impervious to aqueous solutions, both acidic and basic.

16. The method of claim 1, wherein said at least one first layer comprises a laminate of additional thermoplastic films, said additional thermoplastic films chosen from a heat-sealable layer, a gas barrier layer, an anti-stick layer, or a strengthening layer.

17. The method of claim 16, wherein said gas barrier layer has an oxygen transmission rate there-through ranging from 0 to 5 $cm^3/100$ $in^2$ per 24 hours.

18. The method of claim 16, wherein the anti-stick layer comprises a polytetrafluoroethylene containing material.

* * * * *